US008732435B1

(12) United States Patent
Chou et al.

(10) Patent No.: US 8,732,435 B1
(45) Date of Patent: May 20, 2014

(54) SINGLE BUFFER MULTI-CHANNEL DE-INTERLEAVER/INTERLEAVER

(75) Inventors: Shin-I Chou, Hayward, CA (US); Jianchuan Li, San Jose, CA (US)

(73) Assignee: Altera Corporation, San Jose, CA (US)

( * ) Notice: Subject to any disclaimer, the term of this patent is extended or adjusted under 35 U.S.C. 154(b) by 1278 days.

(21) Appl. No.: 12/182,961

(22) Filed: Jul. 30, 2008

(51) Int. Cl.
*G06F 9/26* (2006.01)
(52) U.S. Cl.
USPC .......................................................... 711/217
(58) Field of Classification Search
None
See application file for complete search history.

(56) References Cited

U.S. PATENT DOCUMENTS

| | | | | | |
|---|---|---|---|---|---|
| 5,659,698 | A | * | 8/1997 | Weng et al. | 711/220 |
| 5,765,216 | A | * | 6/1998 | Weng et al. | 711/214 |
| 5,886,998 | A | * | 3/1999 | Voith et al. | 714/702 |
| 6,546,025 | B1 | * | 4/2003 | Dupuy | 370/509 |
| 6,553,517 | B1 | * | 4/2003 | Prasad | 714/702 |
| 6,668,350 | B1 | * | 12/2003 | Kim | 714/759 |
| 7,225,306 | B2 | * | 5/2007 | Tong | 711/157 |
| 7,250,885 | B1 | * | 7/2007 | Nairn | 341/141 |
| 7,302,620 | B2 | * | 11/2007 | Kim | 714/701 |
| 7,539,844 | B1 | * | 5/2009 | Ekanadham et al. | 711/213 |
| 2003/0163776 | A1 | * | 8/2003 | Prasad | 714/752 |
| 2004/0117716 | A1 | * | 6/2004 | Shen | 714/776 |
| 2007/0266222 | A1 | * | 11/2007 | Pisek | 711/217 |

OTHER PUBLICATIONS

John Catsoulis. 2005. Designing Embedded Hardware (2 ed.). Andy Oram (Ed.). O'Reilly Media, Inc., Sebastopol, CA, USA.*

* cited by examiner

*Primary Examiner* — Matthew Bradley
*Assistant Examiner* — Ramon A Mercado
(74) *Attorney, Agent, or Firm* — Womble Carlyle Sandridge & Rice LLP

(57) ABSTRACT

An input data stream is received for processing at an integrated circuit (IC) through multiple channels. The input data stream is interleaved and the interleaved input data stream is stored in a memory buffer associated with the IC. An addressing scheme is defined for reading and writing data samples from and to the memory buffer within the IC. The addressing scheme includes determining a current increment by analyzing a pattern associated with data samples within the memory buffer and determining the memory address for each data sample within the memory buffer using the current increment. A data sample for a frame is read from a corresponding address within the memory buffer using the addressing scheme and a subsequent data sample from the interleaved input data stream is written into the corresponding address of the memory buffer. The current increment and the addressing scheme are stored in the memory buffer. The current increment is dynamically determined by analyzing data samples in the memory buffer after processing of each frame of data and is used in redefining the addressing scheme for subsequent data processing.

20 Claims, 5 Drawing Sheets

| Frame # | Column A<br>memory address | Column B<br>read data | Column C<br>memory address | Column D<br>write data | Column E<br>memory address | Column F<br>read data | Column G<br>write data | Column H<br>memory address | Column I<br>read data |
|---|---|---|---|---|---|---|---|---|---|
| Row X → | 0 | 0 | 0 | 0 | 1 | 1 | 1 | 2 | 2 |
| | 0 | x | 0 | a0(0) | 0 | a0(0) | a0(1) | 0 | a0(1) | a0(2) |
| | 1 | x | 1 | b0(0) | 3 | a1(0) | b0(1) | 9 | a1(1) | b0(2) |
| | 2 | x | 2 | c0(0) | 6 | a2(0) | c0(1) | 7 | a2(1) | c0(2) |
| | 3 | x | 3 | a1(0) | 9 | a3(0) | a1(1) | 5 | a3(1) | a1(2) |
| | 4 | x | 4 | b1(0) | 1 | b0(0) | b1(1) | 3 | b0(1) | b1(2) |
| | 5 | x | 5 | c1(0) | 4 | b1(0) | c1(1) | 1 | b1(1) | c1(2) |
| | 6 | x | 6 | a2(0) | 7 | b2(0) | a2(1) | 10 | b2(1) | a2(2) |
| | 7 | x | 7 | b2(0) | 10 | b3(0) | b2(1) | 8 | b3(1) | b2(2) |
| | 8 | x | 8 | c2(0) | 2 | c0(0) | c2(1) | 6 | c0(1) | c2(2) |
| | 9 | x | 9 | a3(0) | 5 | c1(0) | a3(1) | 4 | c1(1) | a3(2) |
| | 10 | x | 10 | b3(0) | 8 | c2(0) | b3(1) | 2 | c2(1) | b3(2) |
| | 11 | x | 11 | c3(0) | 11 | c3(0) | c3(1) | 11 | c3(1) | c3(2) |
| Row Y → Current increment | | 1 | | | | 3 | | | 9 | |

| Frame # | 3 | 3 | 3 | 4 | 4 | 4 | 5 | 5 | 5 | 6 | 6 | 6 |
|---|---|---|---|---|---|---|---|---|---|---|---|---|
| | Column J | Column K | Column L | Column M | Column N | Column O | Column P | Column Q | Column R | Column S | Column T | Column U |
| Row X → | mem addr | read data | write data | mem addr | read data | write data | mem addr | read data | write data | mem addr | read data | write data |
| | 0 | a0(2) | a0(3) | 0 | a0(3) | a0(5) | 0 | a0(5) | a0(6) | 0 | a0(6) | a0(7) |
| | 5 | a1(2) | b0(3) | 4 | a1(3) | b0(5) | 1 | a1(5) | b0(6) | 3 | a1(6) | b0(7) |
| | 10 | a2(2) | c0(3) | 8 | a2(3) | c0(5) | 2 | a2(5) | c0(6) | 6 | a2(6) | c0(7) |
| | 4 | a3(2) | a1(3) | 1 | a3(3) | a1(5) | 3 | a3(5) | a1(6) | 9 | a3(6) | a1(7) |
| | 9 | b0(2) | b1(3) | 5 | b0(3) | b1(5) | 4 | b0(5) | b1(6) | 1 | b0(6) | b1(7) |
| | 3 | b1(2) | c1(3) | 9 | b1(3) | c1(5) | 5 | b1(5) | c1(6) | 4 | b1(6) | c1(7) |
| | 8 | b2(2) | a2(3) | 2 | b2(3) | a2(5) | 6 | b2(5) | a2(6) | 7 | b2(6) | a2(7) |
| | 2 | b3(2) | b2(3) | 6 | b3(3) | b2(5) | 7 | b3(5) | b2(6) | 10 | b3(6) | b2(7) |
| | 7 | c0(2) | c2(3) | 10 | c0(3) | c2(5) | 8 | c0(5) | c2(6) | 2 | c0(6) | c2(7) |
| | 1 | c1(2) | a3(3) | 3 | c1(3) | a3(5) | 9 | c1(5) | a3(6) | 5 | c1(6) | a3(7) |
| | 6 | c2(2) | b3(3) | 7 | c2(3) | b3(5) | 10 | c2(5) | b3(6) | 8 | c2(6) | b3(7) |
| | 11 | c3(2) | c3(3) | 11 | c3(3) | c3(5) | 11 | c3(5) | c3(6) | 11 | c3(6) | c3(7) |
| Current Increment Row Y → | | 5 | | | 4 | | | 1 | | | 3 | |

SINGLE BUFFER MULTI-CHANNEL DE-INTERLEAVER/INTERLEAVER

BACKGROUND OF THE INVENTION

With the increasing use of computing devices, the usage and need for digital signal processing (DSP) has increased. Applications for DSP include digital image processing, video compression, digital communications, seismology, biomedicine, audio signal processing, audio compression, speech processing, speech recognition, Radio Detection and Ranging (RADAR), Sound Navigation and Ranging (SONAR), to name a few.

The input signals are received at an electronic device, such as a Programmable Logic Device (PLD), through multi-channels in either a burst mode or in a continuous stream mode. The input signals include a plurality of frames and each frame has a plurality of data samples. The data signals of the input streams are passed through electronic filters, such as finite impulse response (FIR) filters, to remove unwanted content. The data signals are then processed at the device, typically, one frame at a time.

In case of burst mode, the data signals are received at the device as a burst at random or pre-defined time periods and are processed by the device using traditional data processing methodology, such as Fast Fourier Transform (FFT) processing. If the FFT processing is sufficiently faster than the input throughput of burst data, the latency associated with data processing is not a big issue.

If the data is received as a continuous input data stream, the device has to process the data efficiently so as to have little or no latency associated with data processing. The data in a multi-channel input data stream is typically interleaved to protect the transmission against "burst" errors. Generally speaking, data is received through an array of analog-to-digital converters (ADCs). These converters are memory less devices which sample the analog source at a specified frequency. In order to prevent data loss due to burst errors, the data is naturally interleaved. Burst errors, as used in telecommunications, refers to a contiguous sequence of data symbols, received over a transmission channel with usually the first and last data symbols being in error. Presence of these errors often results in overwriting of a lot of sequential data bits leading to incorrect deciphering of data using a decoder. The interleaving, thus, protects the transmission data by minimizing correctable data bits due to burst errors per channel, thereby enabling the decoder to decode the code words of the transmitted data correctly.

Upon receipt of the interleaved data, if the data processing (such as FFT) at the device processes the data of the input stream at the same rate as the input throughput, then there is a potential latency associated with the data processing. Especially in frame-based data processing employing a single buffer memory, a whole frame of data of pre-determined length must be available at the memory buffer before data processing can begin. A frame of data, as used in this application, includes a set of data accumulated in a single time block or frame. This format of accumulating data is commonly used in real-time systems where data is usually accumulated from multiple channels. The size of the frame is adjusted to reduce the latency associated with accumulating the data for the frame. While a current frame's data is being processed, the data for the next frame will have to wait till the processing of the current frame data is completed in order to avoid potential memory overwrites. In order to overcome the latency with a single buffer memory, a double buffer memory module may be implemented. In the double buffer memory module, the memory is divided into two buffers, with a first frame's data being processed from a first buffer while the second buffer is being used for writing the next frame of data. This avoids the latency associated with data processing of subsequent frames of data. However, the memory requirements of the double buffer memory module increases depending on the number of channels or the size of frames, reaching resource limitations of the device.

It is, therefore, beneficial to look into alternate ways of minimizing memory usage without compromising on the quality or speed of data processing. It is in this context embodiments of the invention arise.

BRIEF SUMMARY OF THE INVENTION

Broadly speaking, the present invention fills these needs by providing a method and device for processing interleaved input data stream to obtain frame-based data using an addressing scheme which uses a single buffer memory for processing the interleaved data. The algorithm optimizes memory usage while processing streaming data efficiently. The benefits associated by implementing the algorithm includes the optimal use of memory, efficient data processing with half the amount of memory as that of a double buffer memory scheme, and maintaining low to no latency during data processing.

Towards this end, a method for optimizing memory usage during data processing within an integrated circuit (IC) is provided. An input data stream is received for processing at the IC through multiple channels. The input data stream is interleaved to avoid burst errors. The interleaved input data stream is stored in a memory buffer associated with the IC. An addressing scheme is defined for reading and writing data samples from and to the memory buffer within the IC. The addressing scheme includes determining a current increment by analyzing a pattern associated with the data samples within the memory buffer and determining the memory address for each data sample within the memory buffer using the current increment. A data sample for a frame is read from a corresponding address within the memory buffer using the addressing scheme and a subsequent data sample from the interleaved input data stream is written into the corresponding address of the memory buffer. The current increment and the addressing scheme are stored in the memory buffer for subsequent data processing. In addition, the current increment is used in redefining the addressing scheme.

In another embodiment, an integrated circuit (IC), such as a programmable logic device (PLD), includes an address decoder algorithm for optimizing memory usage during frame-based data processing within the IC. The IC is equipped with switching logic that is configured to receive input data streams from a plurality of channels. The data in the input data streams includes a plurality of data samples from a plurality of frames. The data samples from the input data streams are interleaved to avoid burst errors and stored in a memory buffer associated with the IC for data processing. The address decoder algorithm uses a counter for converting the interleaved data into frame-based data. The counter determines a current increment by analyzing data samples within the memory buffer of the IC. The current increment is used to dynamically update a memory addressing scheme within the address decoder algorithm to process subsequent data samples from the input data stream.

Other aspects and advantages of the invention will become more apparent from the following detailed description, taken in conjunction with the accompanying drawings, illustrating by way of example the present invention.

BRIEF DESCRIPTION OF THE DRAWINGS

The present invention will be readily understood by the following detailed description in conjunction with the accompanying drawings, and like reference numerals designate like structural elements.

FIGS. 2A and 2B illustrate an example of data processed using an addressing scheme within an address decoder algorithm of an IC device, in one embodiment of the present invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

The embodiments of the invention include defining an addressing scheme for processing data samples within a memory buffer of an integrated circuit (IC). The data samples are obtained as input data streams through a plurality of channels. The data samples from the plurality of channels are interleaved and received into the memory buffer of the IC. An address decoder algorithm (logic) is used to define a counter for converting the interleaved data into frame-based data. The counter determines a current increment by analyzing data samples within the memory buffer of the IC to identify a pattern associated with the data samples. The current increment, in turn, is used to dynamically update a memory addressing scheme within the address decoder algorithm. The addressing scheme is used to determine the memory address for each data sample within the memory buffer. The current increment and the memory addressing scheme is stored in the memory of the IC for subsequent data sample processing.

Each of the data samples within the memory buffer is read for further processing from a corresponding memory address determined by the addressing scheme and a subsequent data sample from the input data stream is written into the corresponding memory address. The data sample read from a corresponding memory address is a frame-based data sample and the data sample written into the corresponding memory address is an interleaved data sample. The reading and writing of the data samples within the memory buffer using the addressing scheme enables efficient use of memory while maintaining the data processing efficiency of the IC. The frame-based data read from the memory address within the memory buffer is then processed within the IC using established techniques, such as Fast Fourier Transformation (FFT) processing. Thus, the addressing scheme provides an efficient way to process input data stream continuously while maintaining little to no latency during data processing. In addition to the optimal use of memory while maintaining efficient processing, the addressing scheme enables increased input channel processing or increased input channel throughput thereby resulting in a more powerful IC.

Figure 1:
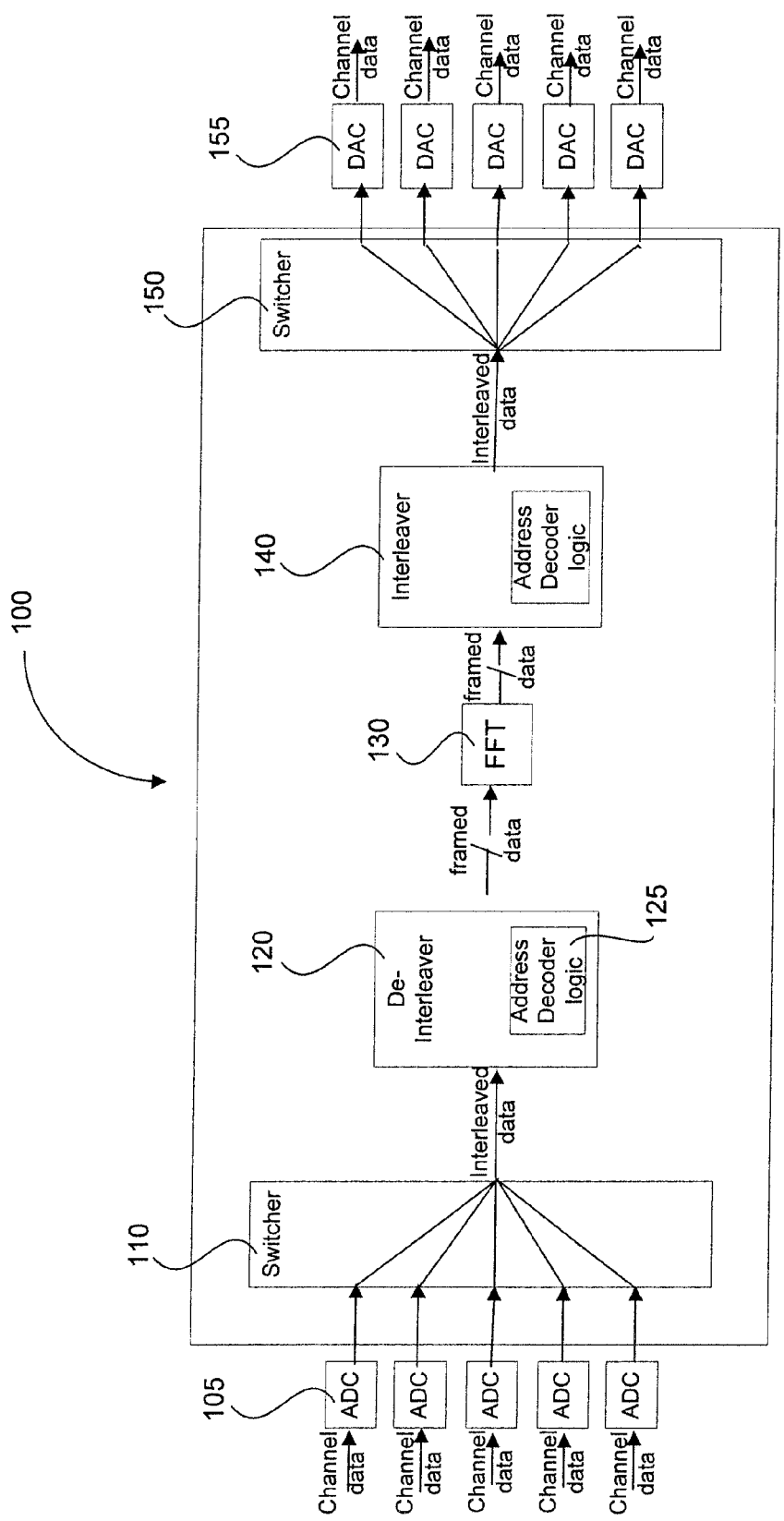
FIG. 1 illustrates a simplified block diagram of an IC device having an address decoder algorithm, in one embodiment of the present invention.

FIG. 1 illustrates a block diagram of various components of the integrated circuit (IC) 100 that is used in processing interleaved data into frame-based data while optimizing memory usage. The IC includes a switcher component (switcher) 110 having switching logic that is configured to receive input data stream from a plurality of input channels and interleave the input data. The input data streams are made up of a plurality of frames from multiple channels with each frame having a plurality of data. The data is received as analog signals. A set of analog-to-digital converters (ADC) 105 are used to receive the data as analog signals from the plurality of channels and convert them to digital data samples. The digital data samples from the plurality of channels are fed into the switcher 110. The switching logic at the switcher 110 is used to interleave the digital data samples associated with the various channels. The interleaved data samples are sent through address decoder logic 125 within a de-interleaver component (de-interleaver) 120. The address decoder logic 125 includes a counter that stores and tracks a current increment. The current increment is used to read frame-based data and write interleaved data in the memory buffer and is obtained by analyzing the distribution of data samples within the memory buffer after each read and write cycle. The current increment is used in defining the memory addressing scheme. The memory addressing scheme is used to determine a corresponding memory address where subsequent data sample received from the channels can be stored prior to processing.

The current increment is determined by analyzing data samples that are already stored in a memory buffer within the IC. The size of the memory buffer is defined as a function of the number of channels, number of frames and frame size at each channel defined by the number of data samples within each of the frames. The memory buffer is a single buffer memory. The data samples in the memory buffer are analyzed to identify a pattern associated with the way the data samples belonging to a frame of a channel are stored in the memory buffer and the current increment is defined based on this analysis. Accordingly, data samples in the memory buffer that belong to a frame of a channel are identified and memory addresses associated with each of the identified data samples are analyzed to establish the current increment. A memory addressing scheme is defined using the current increment. A data sample is read from the memory buffer for processing using the memory addressing scheme (addressing scheme) and a subsequent data sample is written into the memory address from where the data sample was just read. The current increment and the addressing scheme are stored in memory of the IC and are used in the processing of subsequent data samples.

Upon reading frame-based data samples from the memory buffer, the data samples are processed using established processing techniques, such as Fast Fourier Transformation (FFT) processing. An FFT module 130 available within the IC processes the frame-based data samples received from the address decoder logic 125.

The IC 100 may further include an Interleaver module (Interleaver) 140 to interleave the processed data samples received from the FFT module 130. The processed data samples may be interleaved if the data samples have to be transmitted to a device that is internal or external to the IC 100 for further processing. The frame-based data from the FFT module 130 is received at the Interleaver 140 and an address decoder logic within the Interleaver 140 converts the frame-based data into interleaved data. The interleaved data is forwarded to a switcher module 150. The switcher 150 separates the interleaved data into a plurality of channel-based data. Logic within the switcher 150 may identify the number of channels available at the IC through which the interleaved data may be transmitted and separates the interleaved data accordingly into the appropriate number based on the channels available. The channel-based data is processed by a set of digital-to-analog converters (DAC) 155 to convert the digital data to analog signals. The processed analog signals are then transmitted through the appropriate channels to other devices within or external to the IC.

As can be seen, the addressing scheme within the address decoder logic 125 provides an efficient way of optimizing usage of memory buffer while providing the processing efficiency that is similar to a double-buffer memory. The address decoder logic 125 may include logic elements, e.g. logic gates, and require far less memory than the double buffer memory buffer. The small overhead associated with the use of logic elements and the use of a single buffer memory enables an increase in the number of channels or number of data samples within each channel thereby increasing the processing capability of the IC.

With the above general understanding of the IC design, the actual data sample processing using the addressing scheme will now be explained with reference to FIGS. 2A and 2B. FIGS. 2A and 2B illustrate a table of data samples that use the addressing scheme to identify memory addresses of data samples being processed, in one embodiment of the invention. A plurality of data associated with a plurality of frames is received at the IC through a plurality of channels. The data is converted to digital data samples using a set of ADCs available to the IC and then interleaved to avoid burst errors. The converted data samples are processed sequentially in the order they appear in the interleaved data.

As shown in FIG. 2A, data samples from frame 0 are processed initially. A memory buffer within the IC is used to store the interleaved data samples received from the channels prior to processing. In one embodiment, the size of memory buffer can be defined as a function of number of channels and frame size defined by number of data samples within each frame. According to the current embodiment illustrated in FIG. 2A, the memory buffer includes data samples from 3 channels (channels a, b and c), each channel having a frame with a frame size of 4 data samples. Thus, the memory buffer size may be equal to 12 or multiples of 12. In the current embodiment, the memory buffer size is defined as 12 units. The naming convention used in representing a data sample in FIG. 2A identifies the channel, data sample number within the channel and frame number. Thus, data a0(0) represents data from channel 'a', data sample number 0 of frame 0; data sample b0(0) represents data from channel 'b', data sample number 0 of frame 0; data sample c1(0) represents data from channel 'c', data sample number 1 of frame 0, and so on. It should be understood that the embodiment illustrated in FIGS. 2A and 2B is exemplary and should not be considered as limiting. In reality, the input data stream may include data samples received from hundreds of channels with each channel having a frame size of thousands of data samples. As a result, the size of the memory buffer may be defined as a function of a product of number of channels (n) and frame size of each channel (fn(n*m)).

As illustrated in FIGS. 2A and 2B, row X identifies a frame number of a frame of data samples that is being processed and row Y identifies a current increment associated with each frame. The current increment, as explained earlier, is obtained by analyzing the distribution of data samples within the memory buffer for each frame. Columns A, D, G, J, M, P and S identify memory address locations of each data sample within a memory buffer of the IC. Similarly, columns B, E, H, K, N, Q and T identify frame-based data read from a corresponding address in the memory buffer and columns C, F, I, L, O, R and U represent interleaved data written into the corresponding address locations in the memory buffer.

In one embodiment, the memory buffer is considered to be initially empty. Address decoder logic within the IC reads a data sample from a memory address within the memory buffer. In the current embodiment, as the memory buffer is initially empty, there are no actual data samples to read. As a result, the memory buffer is read sequentially from the beginning with a dummy data sample read from a memory address at location 0 within the memory buffer and the processing proceeds sequentially with subsequent dummy data samples read from corresponding memory address locations.

The addressing scheme may include default options with the current increment having a default value. In one embodiment, the default value for the current increment of the addressing scheme may be set to 1, initially. In the current embodiment, using the default options of the addressing scheme, data samples are sequentially read from memory buffer using the default current increment of 1. As a result, data samples from memory address location 0, location 1, location 2, etc., are read sequentially, as shown in column B of FIG. 2A. In the current embodiment, as the buffer memory was initially empty, the sequential read is done on dummy data. After the initial read of the dummy data sample from a memory address, a data sample from the interleaved data received from the channels is written into the memory address from where the dummy data was just read. Accordingly, as shown in FIG. 2A, data sample of interleaved data of frame 0 (a0(0)) (where 'a' is the channel ID, the first '0' is data sample # and the second '0' is frame #) is written into memory address at memory address location 0, as shown in column C, after dummy data was read from memory address location 0, as illustrated in column B. The next memory address for a subsequent read of the data sample is determined by the addressing scheme based on the current increment. As the default current increment for frame 0 processing is 1 (as shown in Row Y of FIG. 2A), dummy data is read from the next memory address location located at location 1, and a subsequent data sample from interleaved data (b0(0)), of frame 0 is written into the memory buffer at address location 1, and so on. Columns B and C illustrate the dummy data read from each location in the memory buffer and the subsequent write of a data sample from the interleaved data of frame 0 into the corresponding address locations in the memory buffer.

Once all the data samples from frame 0 are processed, the data samples within the memory buffer are analyzed to determine a pattern associated with the data samples associated with a frame of a channel. A current increment is defined based on this analysis and the addressing scheme is re-defined. In the current embodiment, based on the analysis of a pattern associated with the distribution of data samples associated with frame 0 in the memory buffer, the current increment is defined to be 3 suggesting that a data sample of a frame for a channel is located at every $3^{rd}$ memory address location in the memory buffer.

Considering the data samples in memory buffer after processing frame 0, the data samples associated with channel 'a' are identified to include a0(0), a1(0), a2(0) and a3(0), given that the frame size for each frame in each channel, in this embodiment, is 4. The current increment is used to re-define the addressing scheme which determines the memory address for each data sample associated with each channel within the memory buffer, for subsequent data sample processing. Thus, as can be seen from the data distribution in column C of FIG. 2A, starting with address location 0, memory address locations for data samples belonging to channel 'a' are identified, by the addressing scheme, to be located in memory address locations in multiples of 3 (current increment) beginning with first data sample, a0(0), located at memory address location 0, second data sample, a1(0), located at memory address location 3, third data sample, a2(0), located at memory address location 6 and fourth data sample, a3(0), located at memory address location 9, respectively.

In order to process subsequent interleaved data samples from frame 1, the data sample of frame 0 in the memory buffer is read sequentially for each channel using the re-defined addressing scheme. The subsequent interleaved data sample from frame 1 is written into the memory address from where the data sample was just read. Accordingly, after data sample, a0(0), is read from memory address location 0, as illustrated in column E, interleaved data for frame 1, a0(1), is written into memory address location 0, as illustrated in column F. Similarly, after reading frame-based data sample of frame 0, a1(0) from memory address location 3, subsequent interleaved data sample of frame 1, b0(1), is written into the memory address location 3, interleaved data sample c0(1) of frame 1 is written into memory address location 6 after the corresponding data sample of frame 0, a2(0), has been read, and so on. Column D illustrates the memory address location from where the data samples are being read during frame 1 processing and column E identifies the actual data samples of frame 0 that are read and column F identifies the actual data samples of frame 1 written to the buffer memory. Row Y identifies the current increment (value of 3) used in determining the addressing scheme for identifying the memory address locations for processing data samples of frame 1.

After processing all the data samples of frame 1, the data within the memory buffer is once again analyzed to determine the pattern associated with the distribution of data samples of frame 1 within the memory buffer and the current increment is determined based on this analysis. In the current embodiment, upon analyzing the data samples in the buffer memory, the current increment for frame 2 processing is determined to be 9, as illustrated in row Y of FIG. 2A. The addressing scheme is re-defined using the current increment. Thus, after processing each frame of data samples, the current increment is dynamically determined and the addressing scheme is re-defined accordingly. The re-defined addressing scheme and the current increment are saved in the memory of the IC for subsequent data sample processing. FIG. 2A illustrates the processing of frame 2 in addition to frame 0 and 1.

FIG. 2B illustrates the processing of frames 3, 4, 5 and 6, by way of example. As explained with respect to FIG. 2A, FIG. 2B includes a row X identifying frame number and a row Y identifying the current increment used in processing the corresponding frame's data samples. As illustrated, column J identifies memory address location used in processing data samples for frame 3. Similarly, columns M, P and S identify the memory address locations of the memory buffer used in processing frames 4, 5 and 6, respectively. The current increment for processing frame 3 data is obtained after analyzing data samples from frame 2 in memory buffer and is shown to be 5, as shown in row Y. This indicates that data samples for each of the channels is located at every $5^{th}$ memory address location of the memory buffer. As suggested by the current increment, during processing of frame 3 data, data sample belonging to the frame of channel 'a', a0(2), is read first from memory address location starting at location 0 and a subsequent interleaved data sample, a0(3), is written to the memory buffer at memory address location 0. The memory address location to read the next frame-based data is identified by the addressing scheme and, as a result, memory address location 5 is read to obtain the next data sample of the frame of channel 'a', a1(2), (as illustrated in column K) and the next interleaved data sample, b0(3) is written to the memory address location 5, as illustrated in column L. The process of reading and writing data samples proceeds till all the data samples for frame 3 are processed and the process of analyzing the pattern associated with distribution of data samples to determine the current increment and re-defining the addressing scheme continues until there are no more data samples to process or till a level of data processing is reached.

Figure 3:
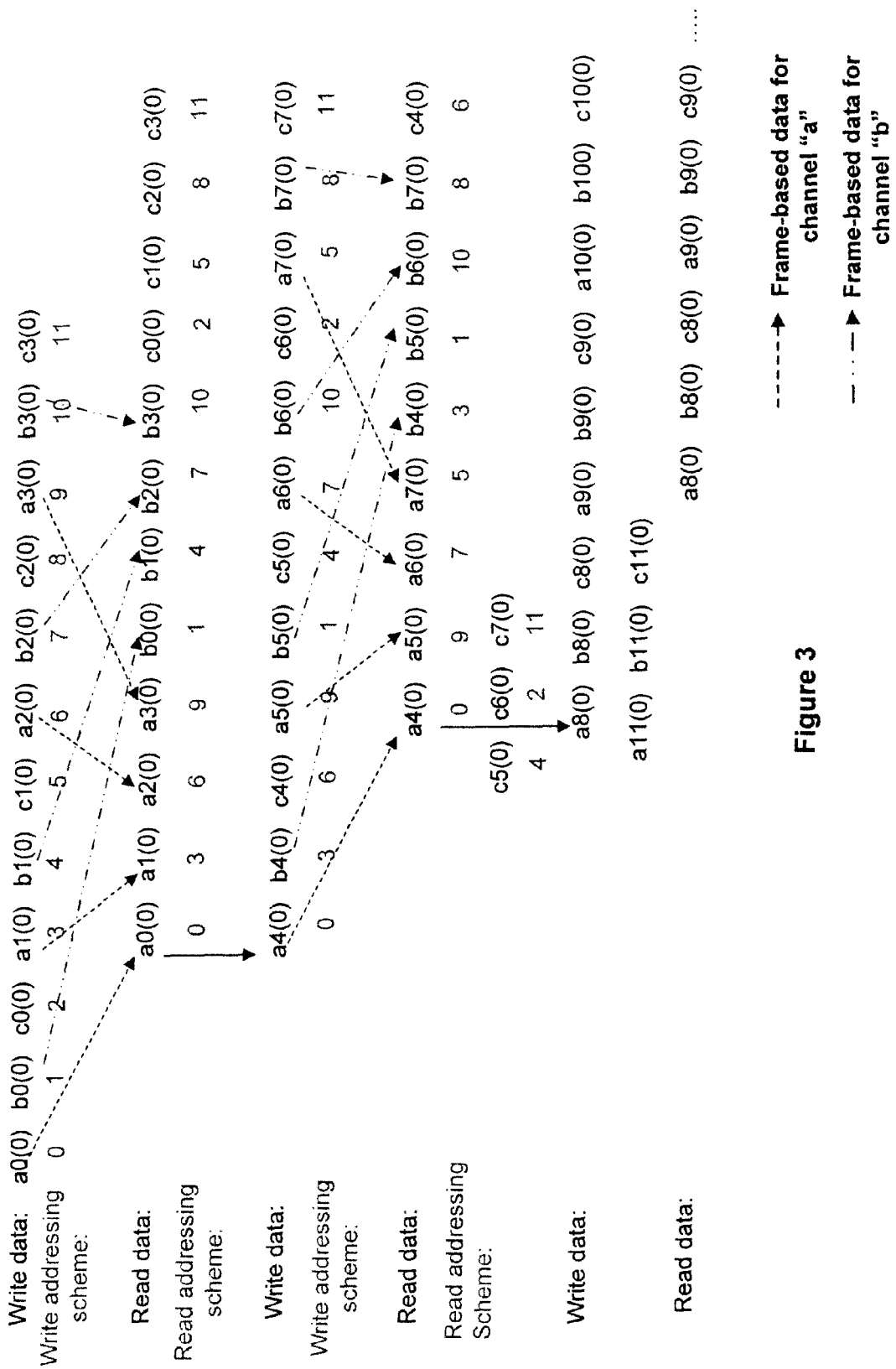
FIG. 3 illustrates a visual representation of a read and write addressing scheme used in processing input data stream, in one embodiment of the invention.

FIG. 3 illustrates a visual representation sample of the addressing scheme used in the processing of data samples represented in FIGS. 2A and 2B, in one embodiment of the invention. As shown in FIG. 3, the addressing scheme identifies the sequence of interleaved data associated with frame 0 that is written into the memory buffer using the write addressing scheme illustrated in FIG. 2A. In this embodiment, the write addressing scheme initially uses a default value for a current increment to determine the memory address into which data samples from interleaved data are written. Thus, using the addressing scheme of the current embodiment with a current increment default value of 1, data sample a0(0) is written in memory address location 0, b0(0) in memory address location 1, c0(0) in memory address location 2, a1(0) in memory address location 3, b1(0) in memory address location 4, and so on. Similarly, when data samples have to be read from the memory buffer, the addressing scheme uses the read addressing scheme illustrated in FIG. 3 to identify the memory addresses of data samples belonging to a frame of a particular channel. As mentioned earlier with respect to FIGS. 2A and 2B, data sample for a frame of a channel is first read from memory address location specified by the addressing scheme and subsequent data sample from interleaved data is written into the corresponding memory address location. Initially, in the embodiment covered under FIGS. 2A and 2B, the memory buffer is considered to be empty and dummy data is read and interleaved data is read into the memory address locations of the memory buffer using the write addressing scheme. As a result, interleaved data sample of frame 0 is written into corresponding memory address locations starting at memory address location 0.

After processing read and write operations for frame 0 of data samples, the data samples in the memory buffer is analyzed to dynamically determine the current increment and to re-define the addressing scheme for reading and writing subsequent data samples. As has already been explained in FIG. 2A, the current increment identifying the pattern of distribution of data samples for a frame of each channel is determined to be 3. The current increment is used in re-defining the addressing scheme for subsequent data sample processing. Thus, the next frame of data is processed using this current increment and re-defined addressing scheme. As shown by the arrows, the data sample, a0(0), from frame 0 is read first starting at the beginning of the memory buffer at memory address location 0 and subsequent interleaved data sample of frame 1, a4(0), is written into the memory address location 0. Similarly, the next frame-based data for channel 'a', a1(0), identified at memory address location 3 is read first and a subsequent interleaved data, b4(0) is written at the memory address location 3, as shown by the arrows. Thus, embodiments of the present invention provide a way to define an addressing scheme that enables optimal use of available memory while maintaining or exceeding the speed of processing of the data samples. Further, the addressing scheme does not have to wait for an entire frame of data to be copied into memory buffer before processing, thereby eliminating unnecessary latency during data processing. The addressing scheme, thus, enables increased data sample input throughput thereby providing a more powerful IC device.

A sample code for an addressing scheme that determines current increment and address for each data sample is provided in Table A. As can be seen, the current increment is determined by analyzing data samples in the memory buffer and is used in dynamically re-defining the addressing scheme.

TABLE A

Addressing scheme algorithm for computing the memory address of each data sample

```
Previous_increment = 1;
Current_increment = 1;
While (1)
{
   Counter = 0;
   For (i = 0; i < frame_size*number_of_channel; i++)
   {
      If (counter + current_increment <= frame_size*number_of_
channel-1)
         counter = counter + current_increment;
      else
         counter = counter + current_increment - (frame_size*number_
of_channel-1);
   }
   Current_increment = (previous_increment * #_channel)%
(total_sample-1);
}
```
As the current increment uses modulus operation on a static number (total_sample), rather than a dynamic number, the computation of the current increment is easier and more straightforward making the addressing scheme easier to adapt.

Figure 4:
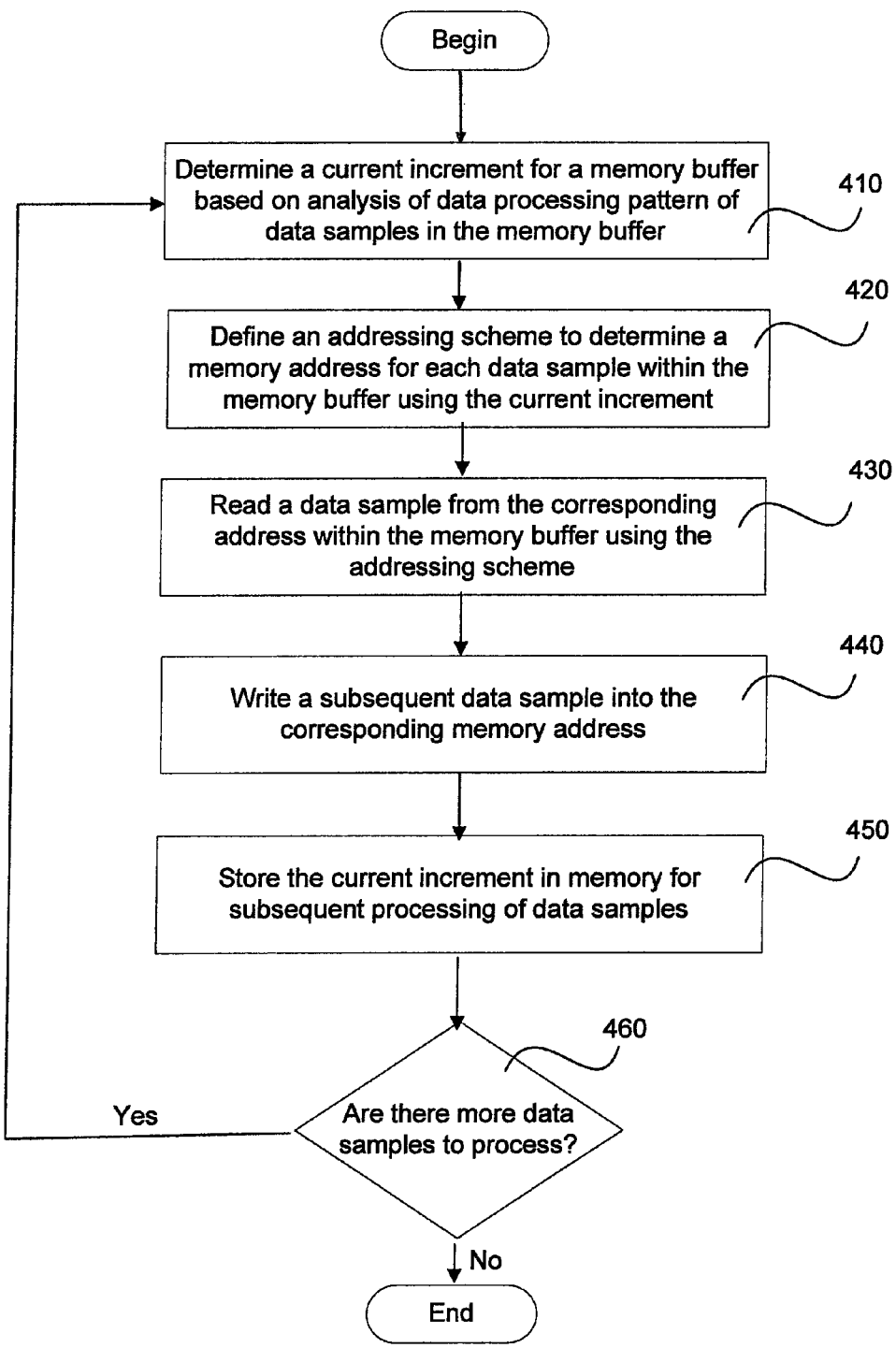
FIG. 4 illustrates a flow chart of operations involved in optimizing memory usage using an addressing scheme, in accordance with one embodiment of the present invention.

With the current embodiments in mind, a method for optimizing memory usage for frame-based data processing within a computing device will now be described with reference to FIG. 4. FIG. 4 illustrates the various process operations involved in optimizing memory usage for frame-based data processing within an integrated circuit (IC) device. The method begins at operation 410 wherein a current increment for a memory buffer within the IC is determined. The IC device receives a plurality of data signals from a plurality of channels. These data signals are received as analog signals and are converted to digital data through a set of analog-to-digital converters available at the IC. The data from a plurality of channels are interleaved and the interleaved data is received at the IC. The data samples from the interleaved data are written into a memory buffer one data sample at a time.

In order to determine the memory address within the memory buffer into which to write the data sample and from where the data sample is read, the current increment and an addressing scheme is used. The current increment is determined by analyzing a pattern associated with data samples within the memory buffer. The addressing scheme is defined using the current increment, as illustrated in operation 420. The determination of the current increment and the re-definition of an addressing scheme are similar to the embodiment discussed with reference to FIGS. 2A and 2B. The addressing scheme is used to determine the memory address for each data sample within the memory buffer.

Upon defining the addressing scheme, a data sample from the memory buffer is read from a corresponding address using the addressing scheme, as illustrated in operation 430. The data sample read from the memory buffer using the addressing scheme is associated with a frame of a specific channel. A subsequent interleaved data sample is written into the corresponding memory address from which the data sample was just read, as illustrated in operation 440. It should be noted here that a data sample is read first prior to writing a subsequent data sample. There may be a small latency involved between the reading and writing of data samples in the memory buffer. However, the latency associated with the processing is negligible and is, therefore, insignificant. Further, the data sample read from memory buffer is a frame-based data sample while the data sample being written into memory buffer is an interleaved data sample from the input data stream. Moreover, it should be noted that the memory buffer used in processing multi-channel interleaved data is a single buffer memory.

After processing all the data samples of a current frame, the data samples in the memory buffer are analyzed to dynamically determine the current increment and re-define the addressing scheme. The current increment and the re-defined addressing scheme are stored in memory of the IC for subsequent data sample processing, as illustrated in operation 450. The process of reading and writing data samples, defining and storing current increment and addressing scheme continues until there are no more data or until a level of data processing is achieved as defined by the decision point 460. Thus, a memory addressing scheme is defined that makes optimal use of memory in the IC while providing efficient processing of data from a continuous input data stream.

The embodiments, described herein may be employed with any integrated circuit, such as processors and programmable logic devices (PLDs). Exemplary PLDs include but are not limited to a programmable array logic (PAL), programmable logic array (PLA), field programmable logic array (FPLA), electrically programmable logic devices (EPLD), electrically erasable programmable logic device (EEPLD), logic cell array (LCA), field programmable gate array (FPGA), application specific standard product (ASSP), application specific integrated circuit (ASIC), just to name a few.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any other suitable application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be the STRATIX® II GX devices owned by the assignee.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

What is claimed is:

1. A method for optimizing memory usage for frame-based data processing within a computing device, comprising:
   defining a dynamic addressing scheme, wherein the dynamic addressing scheme includes determining a current increment for a memory buffer based on an analysis of a pattern associated with a plurality of data samples of a frame stored within the memory buffer, wherein memory addresses of the plurality of data samples from a same channel of the frame are incremented from a starting address of a first data sample by multiples of the current increment, for each channel of a plurality of channels;
   determining a memory address for each data sample within the memory buffer using the current increment;
   reading a data sample from a corresponding memory address within the memory buffer based on the dynamic addressing scheme;
   writing a subsequent data sample from an input data stream into the corresponding memory address within the memory buffer; and
   storing the current increment of the dynamic addressing scheme in the memory buffer for dynamically redefining the dynamic addressing scheme for subsequent processing.

2. The method of claim 1, wherein the pattern is a distribution of the plurality of data samples for the frame of the same channel located in the memory buffer.

3. The method of claim 1, further including:
   reading and writing additional data samples from the input data stream in the memory buffer until each data sample in the input data stream has been processed;
   updating the current increment of the dynamic addressing scheme stored in the memory buffer based on the analysis of the pattern associated with the additional data samples of a next frame in the memory buffer; and
   redefining the dynamic addressing scheme for processing each subsequent frame of data samples based on the updated current increment.

4. The method of claim 1, wherein the dynamic addressing scheme is redefined prior to processing each subsequent frame of data samples.

5. The method of claim 3, wherein the additional data samples from the next frame are interleaved into the buffer memory based on a number of channels, a number of frames in each channel and a frame size, and wherein the additional data samples from the next frame are processed sequentially based on an order of the interleaved additional data samples in the buffer memory.

6. The method of claim 1, wherein reading the data sample from the corresponding memory address further includes,
   identifying the plurality of data samples for the frame based on the current increment; and
   reading the identified plurality of data samples for the frame from the corresponding memory addresses.

7. The method of claim 1, wherein writing the subsequent data sample further includes receiving the subsequent data sample from the interleaved input data stream; and writing the subsequent data sample at the corresponding memory address using the dynamic addressing scheme.

8. The method of claim 1, wherein a size of the memory buffer is a function of a number of channels, a number of frames within each channel and a number of data samples within each frame.

9. The method of claim 1, wherein the memory buffer used in processing data samples of the input data stream is a single buffer memory.

10. An integrated circuit (IC) for optimizing memory usage during frame-based data processing within a computing device, comprising:
    a first switching logic configured to receive an input data stream having a plurality of channels and to interleave data from the plurality of channels, wherein the interleaved data is stored in a memory buffer associated with the IC for data processing, wherein the input data stream includes a plurality of data samples from a plurality of frames; and
    an address decoder logic operable to define a counter used in converting the interleaved data into frame-based data, the counter dynamically storing a current increment for updating a memory addressing scheme within the address decoder logic, wherein the current increment is based on analysis of a pattern associated with a data sample distribution for a frame stored within the memory buffer of the IC, wherein memory addresses for data samples from each channel of the plurality of channels are incremented from a respective starting address by multiples of the current increment, and wherein the memory addressing scheme is used in processing a plurality of subsequent data samples from the input data stream.

11. The IC of claim 10, further including a plurality of analog-to-digital converters (ADC) operable to receive analog signals representing the input data stream, wherein each ADC of the plurality of ADCs is operable to convert the analog signals to digital signals.

12. The IC of claim 10, wherein the IC is a programmable logic device.

13. The IC of claim 10, further including an interleaver logic with an address decoder algorithm, the interleaver logic configured to convert frame-based data into interleaved data.

14. The device of claim 13, further including a second switching logic operable to convert the interleaved data into a plurality of channel-based data streams.

15. The device of claim 14, further including digital-to-analog circuitry (DAC) operable to convert the plurality of channel based data streams from digital format to analog format.

16. The device of claim 10, wherein the address decoder logic, the first switching logic, and a second switching logic comprise a set of logic circuit elements.

17. A computer program embedded in a non-transitory computer-readable storage medium, when executed by one or more processors, causes the one or more processors to execute a method comprising:
    defining a dynamic addressing scheme that includes analyzing a pattern associated with a plurality of data samples of a frame stored in a memory buffer to determine a current increment, and determining a memory address within the memory buffer for each data sample of the plurality of data samples using the current increment, with such determined memory addresses being incremented from a starting address of a first data sample by multiples of the current increment for each channel of a plurality of channels;

reading the data sample from the memory address within the memory buffer and writing a subsequent data sample from an incoming input data stream into the memory address based on the dynamic addressing scheme; and storing the current increment of the dynamic addressing scheme in the memory buffer, the current increment used in dynamically redefining the addressing scheme for subsequent processing.

18. The computer program of claim 17, wherein the pattern associated with the plurality of data samples is a distribution of the plurality of data samples for a frame of a channel located in the memory buffer and wherein the memory buffer is a single memory buffer for storing data samples from the plurality of channels, each channel of the plurality of channels includes a plurality of frames, wherein a size of the single memory buffer is a function of a number of channels, a number of frames within each channel, and a frame size.

19. The computer program of claim 18, wherein reading the data sample further includes,
identifying the plurality of data samples for the frame based on the current increment; and
reading the identified plurality of data samples for the frame from corresponding memory addresses.

20. The computer program of claim 18, wherein writing the subsequent data sample from an incoming input data stream further includes,
receiving the subsequent data sample from the incoming input data stream, wherein the subsequent data sample within the incoming input data stream is interleaved within the plurality of data samples based on the number of channels, the number of frames in each channel and the frame size; and
writing the subsequent data sample at the corresponding memory address using the dynamic addressing scheme.

* * * * *